UNITED STATES PATENT OFFICE.

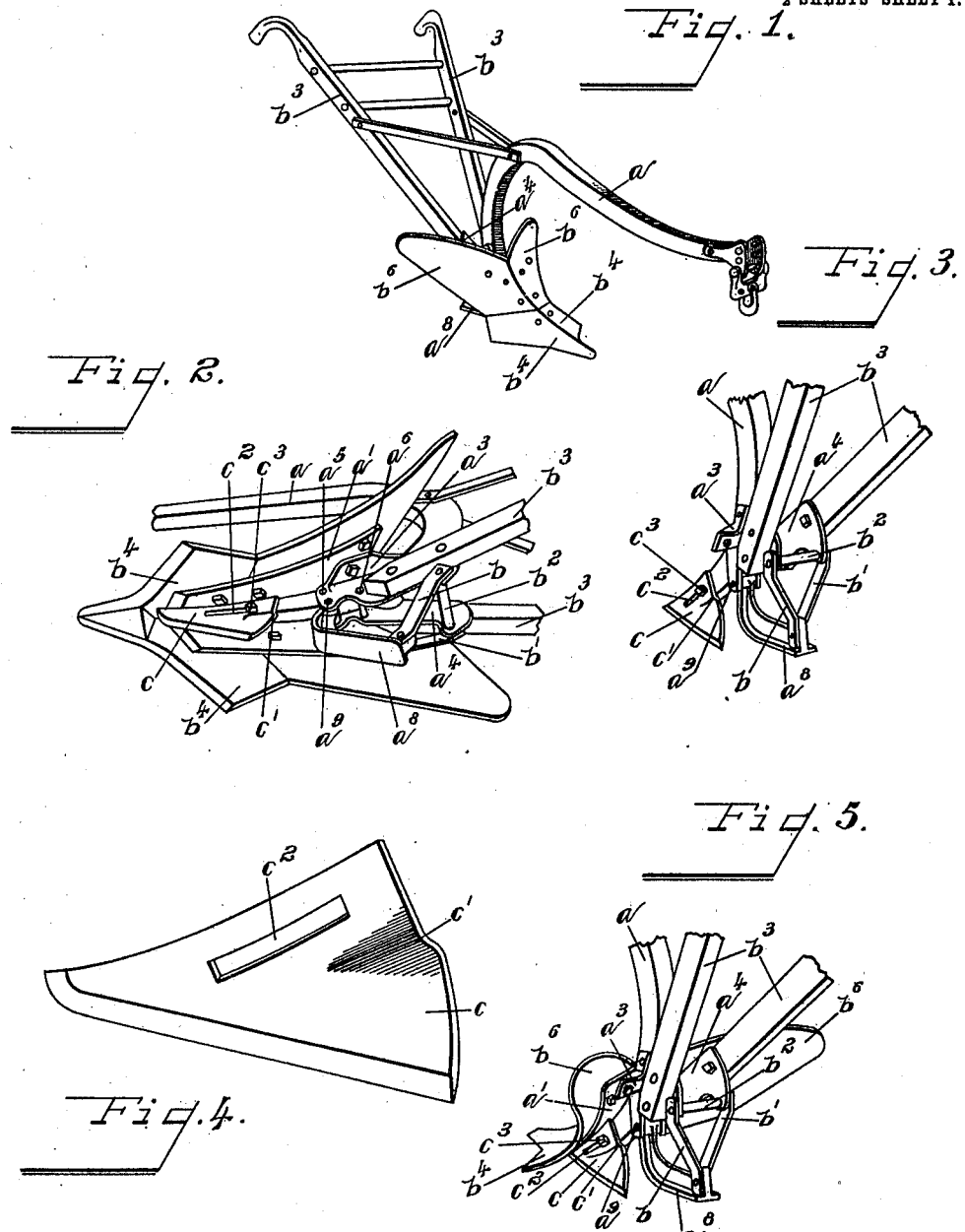

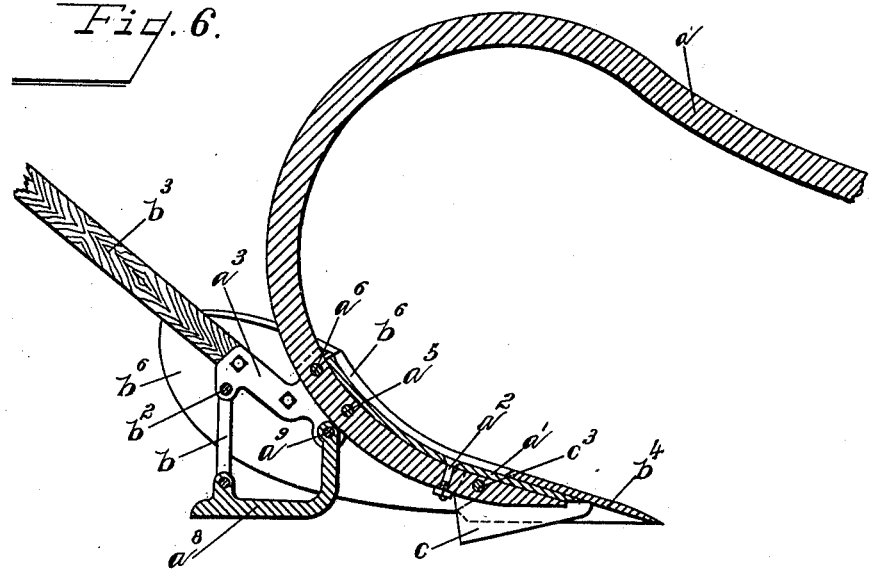
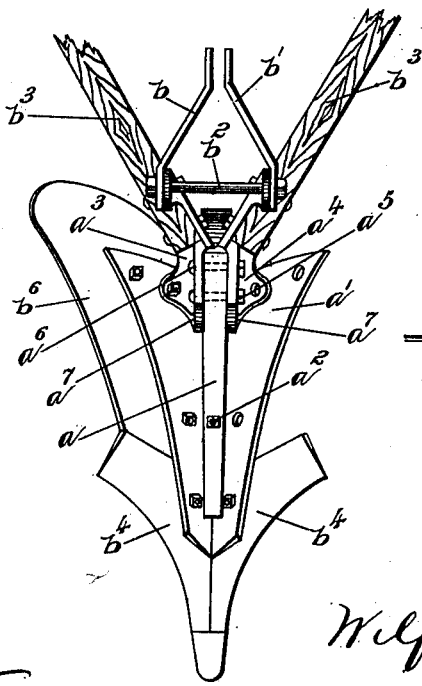

WILFORD H. HOLSCLAW, OF LOUISVILLE, KENTUCKY, ASSIGNOR TO BRINLY-HARDY COMPANY, OF LOUISVILLE, KENTUCKY, A CORPORATION OF KENTUCKY.

PLOW.

992,196.        Specification of Letters Patent.     Patented May 16, 1911.

Application filed May 12, 1910. Serial No. 560,930.

*To all whom it may concern:*

Be it known that I, WILFORD H. HOLSCLAW, a citizen of the United States, residing at Louisville, in the county of Jefferson and State of Kentucky, have invented certain new and useful Improvements in Plows, of which the following is a specification.

This invention relates to a double mold board or middle breaker plow.

The improvement consists in the combination of parts whereby the device is rendered more efficient and the construction simplified.

In a general way the beam or standard of the plow is carried forward to a point beneath the point of the plow and the frog is securely supported to the beam, and the handle-brackets are secured to the frog and to the beam, the parts being so arranged that the handles are properly secured to said handle brackets and a rudder is located beneath the point of the plow and is slidingly mounted on the beam or standard being entirely separate from the slide, said rudder being adjustably mounted and maintained in parallel relation to the line of draft in its various positions of adjustment.

In the drawings: Figure 1 is a perspective view of the plow. Fig. 2 is a view showing the plow turned over on one side. Fig. 3 is a view of the plow with mold board, share and frog removed. Fig. 4 is a detail view of the rudder, Fig. 5 is a rear view of the plow. Fig. 6 is a central, longitudinal sectional view of the plow. Fig. 7 is a bottom plan view.

Like letters of reference indicate like parts throughout the several views.

The beam or standard of the plow is indicated by $a$, and is curved in the ordinary manner, but preferably projects forward to a point near the toe and beneath the point of the plow (see Figs. 2 and 6). The frog $a^1$ is secured to the beam, $a$, near its lowermost end by a bolt $a^2$ (see Figs. 6 and 7). The head of the bolt is counter sunk in the frog $a^1$ as shown clearly in Fig. 6. The handle brackets are shown in pairs, a right and left, marked $a^3$ $a^4$ (see Fig. 7). These handle brackets are preferably bolted to the frog $a^1$. Each handle bracket is so formed that it comprises a support for a handle and a support for the slide. The handle brackets are likewise secured to the beam at their forward ends by the bolts $a^5$ and $a^6$ extending through the web of the beam and through the upturned sides of the handle brackets. At the forward and lower end of each bracket there is a perforation $a^7$ for a pivot upon which the forward end of the slide $a^8$ is mounted. This pivot is preferably shown as a bolt $a^9$ through the handle brackets (see Fig. 6). The slide $a^8$ is preferably shown formed with braces $b$ and $b^1$ projecting upwardly from the rear end of the slide and the upper ends of these braces fit in seats formed in each handle bracket and a bolt $b^2$ securely fastens the braces to the handle brackets. The handles $b^3$ of the plow project downwardly in the usual and ordinary way and the lowermost ends fit into seats formed in each handle bracket and same are securely bolted to the handle brackets as illustrated clearly in Figs. 2 and 5. There is employed a double share $b^4$ (see Fig. 2) which share is secured to the forward part of the frog $a^1$ and constitutes the point of the plow. The double mold boards $b^6$ are likewise bolted to the frog, the right hand mold board being shown removed in Fig. 7. The rudder $c$ (see Fig. 4) is preferably formed with its upper edge conforming to the inner surface of the frog $a^1$ and to that end it is shown slightly concave. It is likewise shown offset at the point $c^1$ and this constitutes means for maintaining the rudder $c$ in parallel relation to the line of draft, it being clear that the rudder $c$ as shown mounted on the end of the beam at one side thereof, the beam being preferably tapered, as indicated in Fig. 7 it is necessary to have means for maintaining that rudder in parallel relation to the line of draft in the different positions of adjustment assumed by it. The rudder is formed with the slot $c^2$ and the bolt $c^3$, extending through the slot and the end of the beam, and the slot and bolt constitute means for adjusting the rudder. As shown in Fig. 2, the rudder is adjusted to its extreme forward position, and when the plow is being transported, the rudder will be moved rearwardly until the bolt $c^3$ will lie at the extreme forward end of the slot. It is apparent that by reason of the conformation of the upper edge of the rudder same will be given an improved bearing against the frog and will be held securely in its various positions of adjustment.

There is here shown an extremely desirable construction of plow in its entirety, such that by removing the nut from bolt $a^2$ and the two bolts fastening the brackets $a^4$ to the frog (Fig. 7) said frog and mold board and share can be disconnected from the balance of the construction as illustrated in Fig. 3.

Having described my invention, I claim:

1. In a plow, the combination of double mold boards, a standard having its upper end curved outwardly away from the mold boards, and its lower end curved inwardly and projecting to the extreme lower end of the plow, a rudder secured to said standard at its lowermost end and projecting beyond the end of the standard and extending to a point near the toe of the share of the plow, substantially as specified.

2. In a double mold board plow, the combination of mold boards and shares with a standard curved upwardly and projecting beyond the plow and also extending inwardly to the extreme inner end of the plow shares, located above the lowermost end of the standard, and a rudder slidingly mounted on the lower end of the standard and at one side thereof and adapted to project to a point beyond the end of the standard and near the toe of the shares, and means for adjusting horizontally said rudder and securing same in adjusting position to the standard, substantially as specified.

In testimony whereof, I have hereunto set my hand this 3rd day of May, 1910.

WILFORD H. HOLSCLAW.

Witnesses:
 JULIA E. CURTIS,
 HERBERT LOUGHRIDGE.

---

Copies of this patent may be obtained for five cents each, by addressing the "Commissioner of Patents, Washington, D. C."